United States Patent [19]

Santella et al.

[11] Patent Number: 5,725,693
[45] Date of Patent: Mar. 10, 1998

[54] FILLER METAL ALLOY FOR WELDING CAST NICKEL ALUMINIDE ALLOYS

[75] Inventors: Michael L. Santella, Knoxville; Vinod K. Sikka, Oak Ridge, both of Tenn.

[73] Assignee: Lockheed Martin Energy Systems, Inc., Oak Ridge, Tenn.

[21] Appl. No.: 611,863

[22] Filed: Mar. 6, 1996

[51] Int. Cl.⁶ .................................................. C22C 19/05
[52] U.S. Cl. ........................ 148/428; 420/443; 420/445
[58] Field of Search ........................... 420/445, 443; 148/428

[56] References Cited

U.S. PATENT DOCUMENTS

| Re. 29,920 | 2/1979 | Baldwin | 420/445 |
| 3,909,309 | 9/1975 | Bomford | 148/675 |
| 4,589,937 | 5/1986 | Jackson et al. | 148/404 |

FOREIGN PATENT DOCUMENTS 583807  12/1946  United Kingdom ............... 420/445

Primary Examiner—Sikyin Ip
Attorney, Agent, or Firm—Ivan L. Ericson

[57] ABSTRACT

A filler metal alloy used as a filler for welding east nickel aluminide alloys contains from about 15 to about 17 wt. % chromium, from about 4 to about 5 wt. % aluminum, equal to or less than about 1.5 wt. % molybdenum, from about 1 to about 4.5 wt. % zirconium, equal to or less than about 0.01 wt. % yttrium, equal to or less than about 0.01 wt. % boron and the balance nickel. The filler metal alloy is made by melting and casting techniques such as are melting the components of the filler metal alloy and east in copper chill molds.

6 Claims, 2 Drawing Sheets

5,725,693

FILLER METAL ALLOY FOR WELDING CAST NICKEL ALUMINIDE ALLOYS

This invention was made with Government support under contract DE-AC05-84OR21400 awarded by the U.S. Department of Energy to Martin Marietta Energy Systems, Inc. and the Government has certain rights in this Invention.

FIELD OF THE INVENTION

The present invention relates to a metal alloy, more particularly, to a filler metal alloy for welding cast nickel aluminide, alloys.

BACKGROUND OF THE INVENTION

Work on phase equilibria and elevated temperature properties of nickel-aluminum-chromium alloys has been done by C. M. Hammond, R. A. Flinn, and Lars Thomassen, "Phase Equilibria and Elevated-Temperature Properties of Some Alloys in the System $Ni_3Cr$—$Ni_3Al$," *Transactions of the Metallurgical Society of AIME*, v.221, pp.400–405 (1961).

The nickel aluminide filler metal alloys IC221W (8 wt. % aluminum, 7.7 wt. % chromium, 2.61 wt. % zirconium, 0.003 wt. % boron and the balance nickel) and IC396W (8 wt. % aluminum, 7.7 wt. % chromium, 2.61 wt. % zirconium, 3 wt. % molybdenum, 0.003 wt. % boron and the balance nickel) described in assignees U.S. Pat. No. 5,108,700 to Liu and U.S. Pat. No. 5,413,876 to Santella et al. are effective for making weld deposits which do not crack on the cast nickel aluminide alloys IC221M and IC396M. The "W" following the numerical designation IC221 and IC396 was used in U.S. Pat. No. 5,413,878 to distinguish their alloys from the IC221 and IC396 alloys described in U.S. Pat. No. 5,108,700. The "M" following the numerical designation IC221 and IC396 was used in U.S. Pat. No. 5,108,700 to indicate low boron modification in at. percent: 16.0% aluminum, 8.0% chromium, 1.7% molybdenum, 0.50% zirconium, 0.025% boron, and the balance nickel.

IC221W and IC396W, like their base alloy counterparts, have limited ductility even though the weld deposits did not crack on the cast nickel aluminide alloys IC221M and IC396M. This characteristic is undesirable because it complicates the manufacturing of rod and wire products needed as feedstock to produce welding consumables; and, it contributes to the sensitivity of the weld deposits to cracking induced by thermal stresses generated during welding. The difficulty in making wires is a serious drawback to the production of welding consumables by conventional processing techniques, and may limit the widespread use of the nickel aluminides.

OBJECTS OF THE INVENTION

Accordingly, it is an object of the present invention to provide a more ductile filler metal alloy for welding cast nickel aluminide alloys. Further and other objects of the present invention will become apparent from the description contained herein.

SUMMARY OF THE INVENTION

In accordance with one aspect of the present invention, a new and improved filler metal alloy comprises from about 15 to about 17 wt. % chromium, from about 4 to about 5 wt. % aluminum, from about 1 to about 4.5 wt. % zirconium, equal to or less than about 0.01 wt. % yttrium, equal to or less than about 0.01 wt. % boron and the balance being nickel.

In accordance with another aspect of the present invention, a new and improved filler metal alloy comprises from about 15 to about 17 wt. % chromium, from about 4 to about 5 wt. % aluminum, from about 1 to about 4.5 wt. % zirconium, equal to or less than about 0.01 wt. % yttrium and the balance being nickel.

Figure 1:
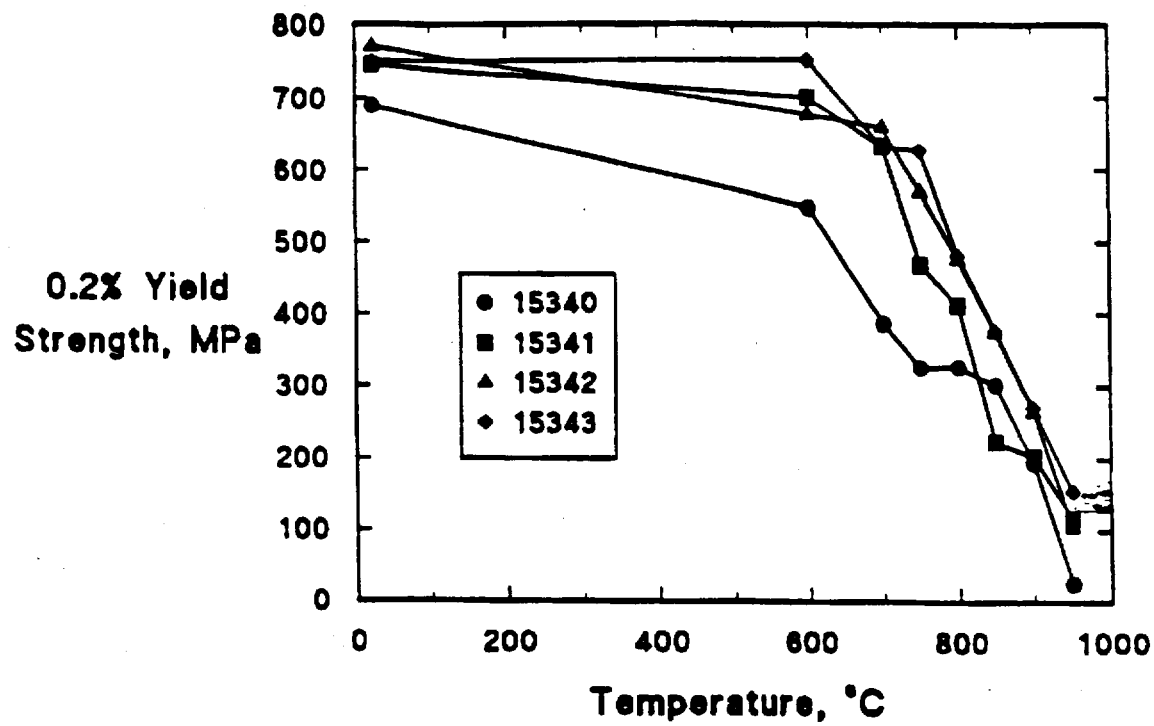
FIG. 1 is a graph of the variation of yield strength with test temperature for tensile specimens made from annealed sheets of Ni—16Cr—4.5Al wt. % alloys in accordance with the present invention.

For a better understanding of the present invention, together with other and further objects, advantages and capabilities thereof, reference is made to the following disclosure and appended claims in connection with the above described drawings.

DETAILED DESCRIPTION OF THE PREFERRED EMBODIMENTS

This invention is an alloy with improved ductility compatible with the welding of cast nickel aluminide alloys. The improved ductility gives the new weld filler metal alloys of the present invention the ability to be processed by normal metalworking techniques thereby substantially improving their commercial appeal. These filler metal alloys are compatible with cast nickel aluminide alloys (IC221M & IC396M) in terms of chemical and environmental resistance and are used as filler metals for welding these base metal alloys.

It was found that Ni—Al—Cr alloys with good ductility at both ambient and elevated temperatures can be formulated between compositions of Ni—15.7Cr—1.6Al wt. % and Ni—12.6Cr—8.2Al wt. %. Also, it was noted that the ductility of nickel aluminides alloys deteriorates as aluminum concentrations of these alloys increase. The east nickel aluminide alloys contain about 8 wt. % Al. Altogether, we found that it would be possible to develop new alloys which met the desired criteria with compositions in the range of Ni—(12-16)Cr—(<8)At wt. %. Molybdenum and zirconium were added to the new alloys to further maintain close chemical compatibility and weldability with the cast nickel aluminide alloys.

The alloys initially used in developing the present invention are given in Table 1. These compositions were made by are melting and cast into 25×9.5×125 mm copper chili molds. The Cr contents were chosen based on the work cited above. The Zr content of 3 wt. % was chosen because previous work we did showed that this concentration was effective for preventing weld solidification cracking in nickel aluminide alloys. Our evaluation of new alloys was based on first determining whether a particular composition could be hot and cold rolled. Only in the event that an alloy could be hot and cold rolled was its tensile properties and weldability assessed. The ingots were then hot rolled at 1050° C. to a final thickness of approximately 1.4 min. Only ingot no. 15082 could not be hot rolled. This result suggested that to maintain hot workability, alloys based on Ni—16Cr—3Zr wt. % should contain less than 6 wt. % Al. The alloys numbered 15100–15102 were made to determine the effect of Zr content on ductility. The effect of Zr content on rolling behavior was negligible. Alloy no. 15100 could not be hot rolled, confirming that the Al content would need to be restricted to less than 6 wt. % regardless of Zr content.

TABLE 1

Nominal compositions for initial group of experimental alloys

| Melt no. | Chemical composition, wt % | | | | |
|---|---|---|---|---|---|
| | Ni | Cr | Al | Zr | B |
| 15079 | balance | 12.0 | 4.0 | 3.0 | 0.003 |
| 15080 | balance | 12.0 | 2.0 | 3.0 | 0.003 |
| 15081 | balance | 12.0 | 0.0 | 3.0 | 0.003 |
| 15082 | balance | 16.0 | 6.0 | 3.0 | 0.003 |
| 15083 | balance | 16.0 | 4.0 | 3.0 | 0.003 |
| 15084 | balance | 16.0 | 0.0 | 3.0 | 0.003 |
| 15100 | balance | 16.0 | 6.0 | 0.0 | 0.003 |
| 15101 | balance | 16.0 | 4.0 | 1.5 | 0.003 |
| 15102 | balance | 16.0 | 4.0 | 4.5 | 0.003 |

Of the alloys shown in Table 1, nos. 15083, 15101, and 15102 were considered the most promising for further development because their relatively high Cr content of 16 wt. % would assure that good oxidation resistance was maintained at the reduced Al contents. The hot rolled sheets of three alloys were subsequently reduced by cold rolling to a thickness of approximately 0.75 mm. The cold rolling proceeded using reductions of about 20% followed by annealing in vacuum for 1 h at 1100° C. Tensile specimens with gage dimensions of 12.5×3.2 mm were punched from the annealed sheets and tested at room temperature and at 750° C. These tensile test data are given in Table 2. The strength of all three alloys decrease at the higher test temperature, but their ductilities increased confirming that hot working of the alloys would be possible. The alloy no. 15101 with a Zr content of 1.5 wt. % showed the best combination of strength and ductility.

TABLE 2

Tensile test data from initial group of experimental alloys.

| Melt no. | Test temp. °C. | Yield strength, MPa | Tensile strength, MPa | Reduction of area |
|---|---|---|---|---|
| 15083 | 20 | 1,473.1 | 1569.4 | 5.3 |
| 15083 | 750 | 637.1 | 698.6 | 14.5 |
| 15101 | 20 | 713.5 | 1121.7 | 18.4 |
| 15101 | 750 | 605.8 | 678.0 | 34.8 |
| 15102 | 20 | 884.6 | 1134.2 | 4.4 |
| 15102 | 7500 | 600.5 | 698.1 | 37.0 |

Pieces of the annealed sheets of alloys no. 15101 and 15102 were sheared into strips and then used as filler metal for manual gas tungsten are welding (GTAW) of 15-mm-thick plates cut from an IC221M casting. The weldment plates were prepared with a double-vee groove configuration, and the root weld beads were partially removed by grinding in order to complete the full-penetration welds. Argon gas shielding was used and the plates were not preheated. Both alloys had good operating characteristics as weld filler metals, and both produced welds of acceptable appearance. A weldment was made with the no. 15101 alloy filler metal. The weldment was radiographed and found to be free of defects. Six weldment tensile specimens were then cut from the weldment plate and two each were tested at room temperature, 750° C., and 900° C. All of the specimens failed in the IC221M base alloy showing that the no. 15101 alloy filler metal was effective for producing strong welds of IC221M base material.

At this time it became known to us that the base composition of our newly developed experimental alloys (Ni—16Cr—4Al wt. %) had similar wt. % of Cr and Al as an alloy already commercially available. The commercial alloy is Haynes (Cabot) alloy no. 214; it has a nominal composition range of Ni—(15–17)Cr—(4–5)Al—(2–6)Fe—0.01Y wt. %, and a preferred composition of Ni—16Cr—4.5Al—3.0Fe—0.01Y wt. %. Based on this information it was decided to compared our experimental alloys directly with the Haynes alloy no. 214. To do this the alloys compositions given in Table 3 were prepared as outlined previously and hot and cold rolled into sheets approximately 0.030 in thick. The sheets were annealed at 1100° C. for 1 h in vacuum, and tensile specimens were prepared from the sheets as outlined previously. Alloy no. 15340 is the preferred composition of Haynes alloy no. 214. Alloys no. 15341 and 15342 were formulated to determine, respectively, how additions of 1.5 wt. % Zr or 1.5 wt. % Zr+1.5 wt. % Mo would affect the behavior of the Haynes alloy. Alloy no. 15343 was formulated as an optimized composition for a weld filler metal alloy compatible with the cast nickel aluminides. It should be noted that Fe decreases the strength of nickel aluminides and is considered an undesirable addition to their chemical composition. Additions of Fe would not intentionally be made to nickel aluminide alloys, so our intent was to avoid Fe to whatever extent possible.

TABLE 3

Nominal compositions for comparison of experimental alloys with Haynes alloy no. 214.

| Melt no. | Chemical composition, wt % | | | | | |
|---|---|---|---|---|---|---|
| | Ni | Cr | Al | Fe | Mo | Zr | Y |
| 15340 | balance | 16.0 | 4.5 | 3.0 | — | — | 0.01 |
| 15341 | balance | 16.0 | 4.5 | 3.0 | — | 1.5 | 0.01 |
| 15342 | balance | 16.0 | 4.5 | 3.0 | 1.5 | 1.5 | 0.01 |
| 15343 | balance | 16.0 | 4.5 | — | 1.5 | 1.5 | 0.01 |

Figure 2:
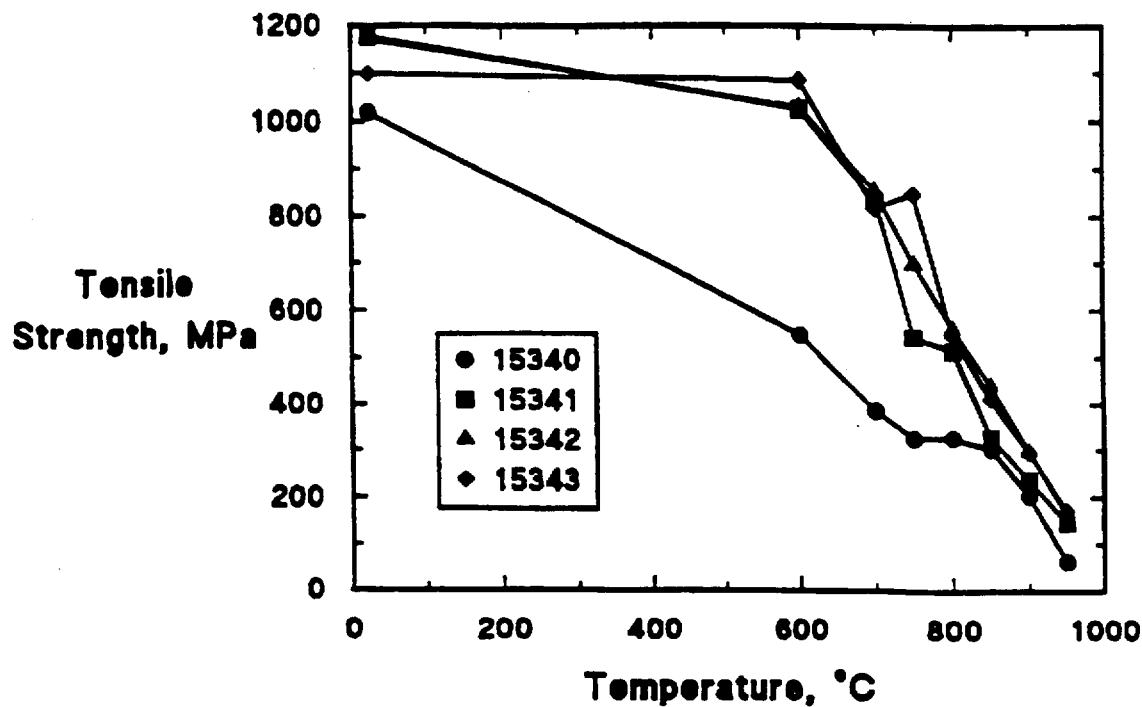
FIG. 2 is a graph of the variation of tensile strength with test temperature for tensile specimens made from annealed sheets of Ni—16Cr—4.5Al wt. % alloys in accordance with the present invention.
Figure 3:
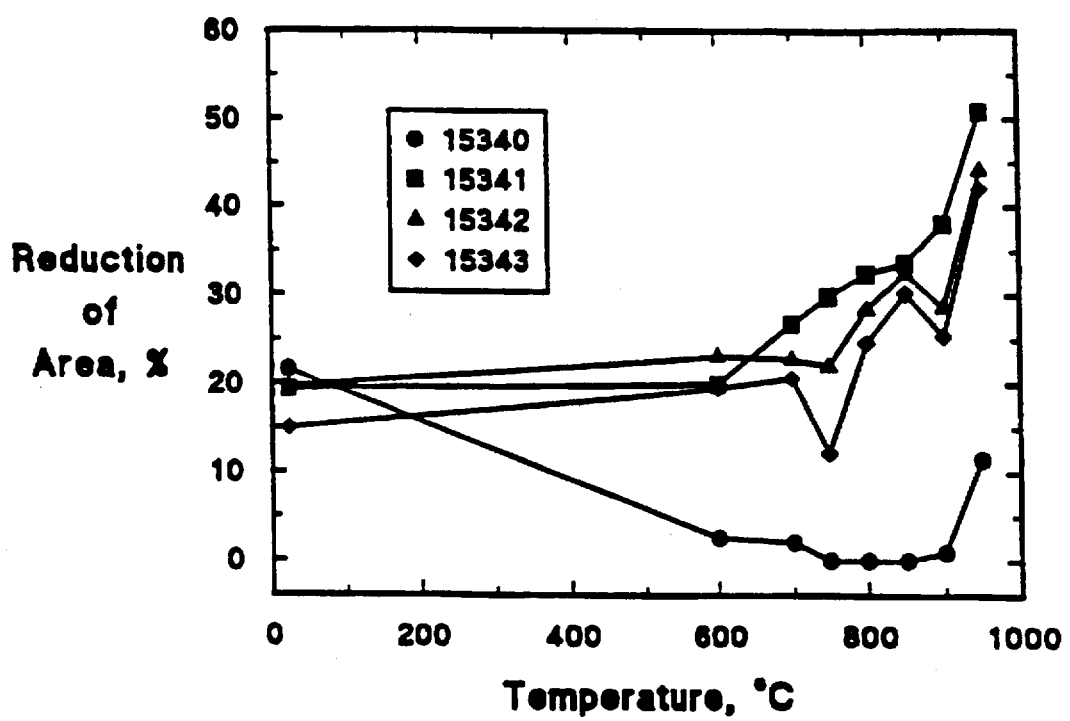
FIG. 3 is a graph of the variation of ductility (reduction of area) with test temperature for tensile specimens made from annealed sheets of Ni—16Cr—4.5Al wt. % alloys in accordance with the present invention.

The results of tensile testing the alloys given in Table 3 are presented in FIGS. 1–3. FIG. 1 is a graph showing the variation of yield strength with test temperature for tensile specimens made from annealed sheets of Ni—16Cr—4.5Al wt. % alloys. Alloy no. 15340 represents the Haynes alloy no. 214 composition. FIG. 2 is a graph showing the variation of tensile strength with test temperature for tensile specimens made from annealed sheets of Ni—16Cr—4.5Al wt. % alloys. Alloy no. 15340 represents the Haynes alloy no. 214 composition. FIG. 3 is a graph showing the variation of ductility (reduction of area) with test temperature for tensile specimens made from annealed sheets of Ni—16Cr—4.5Al wt. % alloys. Alloy no. 15340 represents the Haynes alloy no. 214 composition. Alloy no. 15340 (Haynes alloy no. 214) consistently had the lowest yield strength, tensile strength, and ductility of this group of alloys. Each of our experimental alloys showed a significant increase of yield strength compared to the Haynes alloy no. 214 composition under nearly every testing condition. These data show that adding either Zr alone or in combination with Mo to the Haynes alloy no. 214 base composition improved its strength and ductility. It is also shown that omitting the Fe addition from the alloy did not degrade the tensile properties.

The effectiveness of the experimental alloys as weld filler metals for the cast nickel aluminides was assessed as outlined previously, except that rather than a strip of alloy no. 15340, a small quantity of commercially produced Haynes alloy no. 214 rod was used. It was discovered that only the alloys containing Zr produced acceptable welds on coupons of cast nickel aluminide base material. In comparison, the Haynes alloy no. 214 consistently produced welds with cracks. Subsequent to this evaluation, a considerable mount of incidental data supported the conclusion that an addition of at least 1.0 wt. % Zr to the Ni—16Cr—4Al base alloy is essential if crack-free weld deposits on the east nickel aluminide alloys are desired.

The present invention includes the following alloy compositions: operable composition range, Ni—(15–17)Cr—(4–5)Al—(0–1.5)Mo—(1–4.5)Zr—(0–0.01)Y wt. % and Ni—(15–17)Cr—(4–5)Al—(0–1.5)Mo—(1–4.5)Zr—(0–0.01)Y wt. %—(0–0.01)B wt. %; preferred compositions, Ni—(15–17)Cr—(4–5)Al—(1–1.5)Mo—(1–2)Zr—(0–0.01)Y wt. % and Ni—(15–17)Cr—(4–5)Al—(1–1.5)Mo—(1–2)Zr—(0–0.01)Y wt. %— (0.001–0.01)B wt. %; and specific compositions Ni—(16)Cr—(4.5)Al—(1.5)Mo—(1.5)Zr—(0.01)Y wt. % and Ni—(16)Cr—(4.5)Al—(1.5)Mo—(1.5)Zr—(0.01)Y wt. %—(0.003)B wt. %. This new alloy is meant to be used as a filler metal for welding east nickel aluminide alloys, and the additions of Zr are essential for preventing weld cracking. The new alloy maintains good strength and ductility in the temperature range of 20°–1000° C., and can be processed by normal metalworking techniques.

The most important features of the present invention are that the preferred alloys can be processed by normal metalworking methods; and, that they can be used to produce crack-free weld deposits on the cast nickel aluminide alloys, IC221M and IC396M.

The present invention is distinguished from prior art references in that the prevention of weld cracking depends on and is achieved through the addition of 1–4.5 wt. % Zr to the base alloy composition of Ni—16Cr—4Al wt. %. The preferred alloy can be produced as a bare wire electrode for welding, and can also be used as wire for coated or flux-cored electrodes. It is possible that the alloy could alternatively be used as an alloys for plate, pipe, castings, etc.

The composition range of the alloys could possibly be expanded to higher Al concentrations, for instance by examining alloys of lower Cr content.

The development of commercially viable weld filler metals is a major component of efforts to commercialize the cast nickel aluminide alloys. The success of several applications for which the nickel aluminides are under consideration depends directly on the ability to weld them. The development of an alloy which can be made into wire for producing welding consumable materials is a major advance. The alloys of the present invention have been used in critical situations to permit industrial trials of east nickel aluminides.

While there has been shown and described what is at present considered the preferred embodiments of the invention, it will be obvious to those skilled in the art that various changes and modifications may be made therein without departing from the scope of the invention as defined by the appended claims.

What is claimed is:

1. A filler metal alloy for welding cast nickel aluminide alloys consisting essentially of from about 15 to about 17 wt. % chromium, from about 4 to about 5 wt. % aluminum, equal to or less than about 1.5 wt. % molybdenum, from about 1 to about 4.5 wt. % zirconium, greater than zero to about 0.01 wt. % yttrium and the balance being nickel.

2. A filler metal alloy in accordance with claim 1 wherein said chromium is about 16 wt. % to about 17 wt. %, said molybdenum is about 1 wt. % to about 1.5 wt. % and said zirconium is about 1 wt. % to about 2 wt. %.

3. A filler metal alloy in accordance with claim 1 wherein said chromium is about 16 wt. %, said aluminum is about 4.5 wt. % aluminum, said molybdenum is about 1.5 wt. %, said zirconium is about 1.5 wt. % zirconium and said yttrium is about 0.01 wt. %.

4. A filler metal alloy for welding cast nickel aluminide alloys consisting essentially of from about 15 to about 17 wt. % chromium, from about 4 to about 5 wt. % aluminum, greater than zero to about 1.5 wt. % molybdenum, from about 1 to about 4.5 wt. % zirconium, equal to or less than about 0.01 wt. % yttrium, equal to or less than about 0.01 wt. % boron and the balance being nickel.

5. A filler metal alloy in accordance with claim 4 wherein said chromium is about 16 wt. % to about 17 wt. %, said molybdenum is about 1 wt. % to about 1.5 wt. %, said zirconium is about 1 wt. % to about 2 wt. % and said boron is about 0.001 to about 0.01 wt. %.

6. A filler metal alloy in accordance with claim 4 wherein said chromium is about 16 wt. %, said aluminum is about 4.5 wt. % aluminum, said molybdenum is about 1.5 wt. %, said zirconium is about 1.5 wt. %, said yttrium is about 0.01 wt. % and said boron is about 0.003 wt. %.

* * * * *